William C. Meiser
INVENTOR

April 27, 1937.  W. C. MEISER  2,078,503
SHACKLE STOP
Filed Oct. 12, 1935   3 Sheets-Sheet 3

William C. Meiser
INVENTOR

WITNESS -

ATTORNEY

Patented Apr. 27, 1937

2,078,503

UNITED STATES PATENT OFFICE 2,078,503

SHACKLE STOP

William C. Meiser, Chicago, Ill., assignor to Industrial Patents Corporation, Chicago, Ill., a corporation of Delaware Application October 12, 1935, Serial No. 44,745

11 Claims. (Cl. 104—91)

This invention relates to an improved shackle stop and feed mechanism.

One of the objects of this invention is to provide means for automatically feeding shackled objects at spaced intervals.

Another object of this invention is to provide means for automatically feeding shackled carcasses to a shackle releasing means at spaced intervals.

Another object of this invention is to provide means for automatically feeding shackled carcasses traveling by gravity on an inclined rail to a shackle releasing means at spaced intervals.

Another object of this invention is to provide means for stopping shackled carcasses traveling by gravity on an inclined rail and means in operative relation with said first mentioned means for feeding the shackled carcasses in spaced relation to a shackle releasing means.

Other objects will be apparent from the description and claims which follow.

One embodiment of the present invention is disclosed in the accompanying drawings, in which similar reference characters in the several figures designate similar parts.

Figure 1:
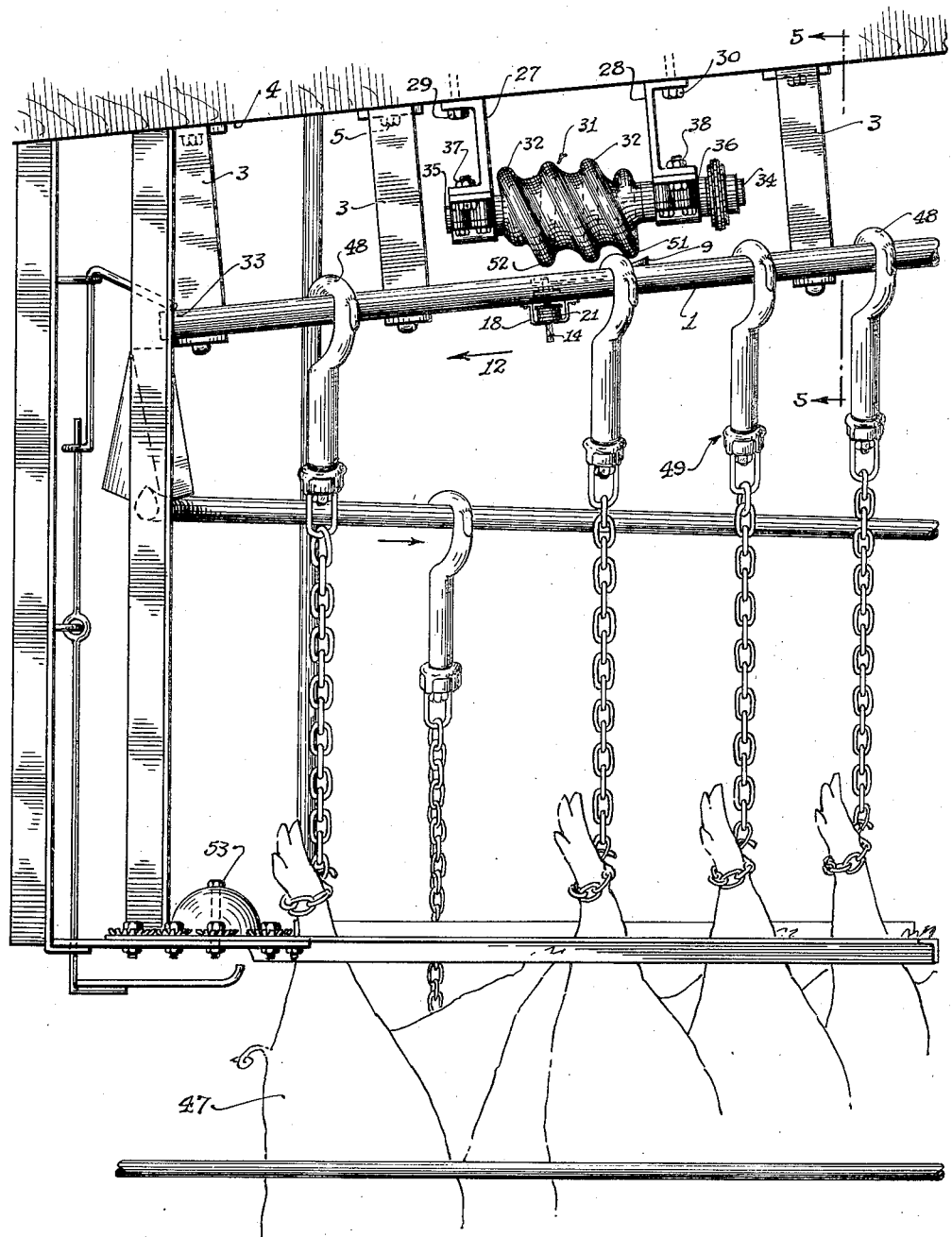
Figure 1 is a side elevational view of a conveying means utilizing the stop and feed mechanism of the present invention and showing the manner in which shackled carcasses are advanced toward the releasing means.

Referring now to the drawings, bleeding rail 1, having an elongated slot 2 countersunk in the upper surface thereof, is rigidly affixed to a plurality of supports 3 secured to beam 4 as by bolts 5. Beam 4 is fixed in an elevated position by suitable means not shown.

Rocker 7 is pivotally mounted within slot 2 by pin 8. Rocker 7 consists of short arm 9 and long arm 11 extending from pivot 8 to form an angle substantially 160°, as indicated by the letter A. Arms 11 and 9 respectively extend from pivot 8 in a direction with and against the path of travel of shackled objects traveling on bleeding rail 1. The shackles travel from the loading end to the releasing end of bleeding rail 1 in the direction of the arrow indicated by the numeral 12. Rocker 7 is mounted within slot 2 in such a manner that either of the arms 9 or 11 may be fully depressed below the surface of the rail 1.

Arm 11 is recessed at 13 for the reception of stem 14 pivotally mounted therein by pin 15. Stem 14 passes downwardly through opening 16 in bleeding rail 1, and opening 17 in yoke 18 secured to bleeding rail 1 by bolts 19 and 20. Arm 11 is normally maintained in a raised position by coil spring 21 interposed between yoke 18 and flange plate 22 engageable with pin 23 in stem 14. Bleeding rail 1 is recessed at 24 for the reception of flange plate 22 and coil spring 21.

Angle brackets 27 and 28 are secured to beam 4 by bolts 29 and 30 respectively. Worm wheel 31, having a plurality of threads 32, is pinioned to shaft 34 and when rotated serves to urge shackles coming in contact therewith toward the discharge end 33 of bleeding rail 1. Shaft 34 is journaled within bearings 35 and 36 secured to angle brackets 27 and 28 by bolts 37 and 38, respectively.

Figure 2:
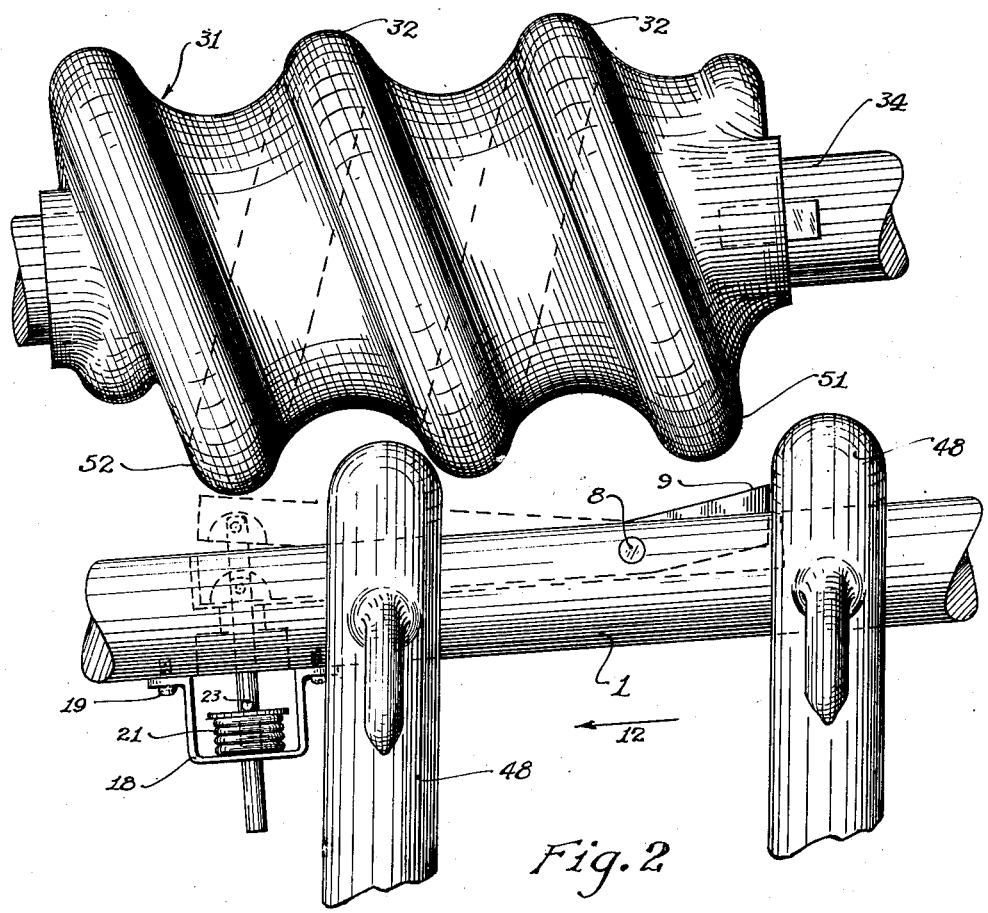
Figure 2 is an enlarged detailed view of the shackle stop and feed mechanism, the shackle stop being shown in dotted lines in its normal resting position and in full lines as it will appear during the feeding of a shackled carcass to the releasing means.
Figure 3:
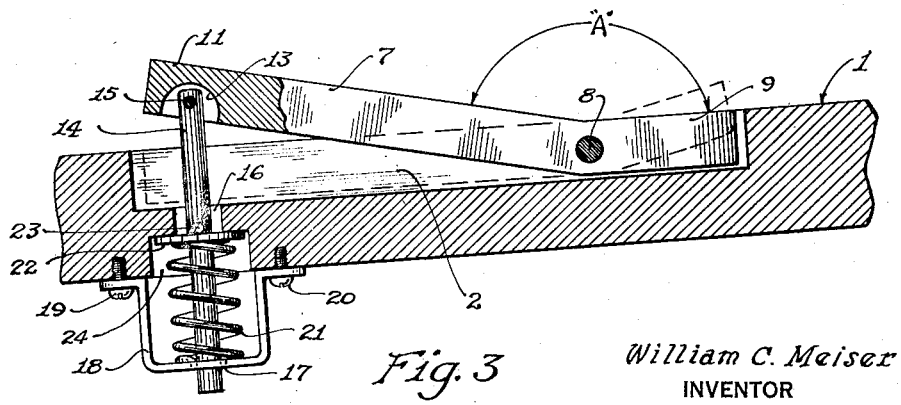
Figure 3 is an enlarged detailed view, partly in section, of the stopping means, shown in full lines in its normal resting position and in dotted lines as it will appear during the conveyance of a shackled carcass through the feed mechanism.
Figure 4:
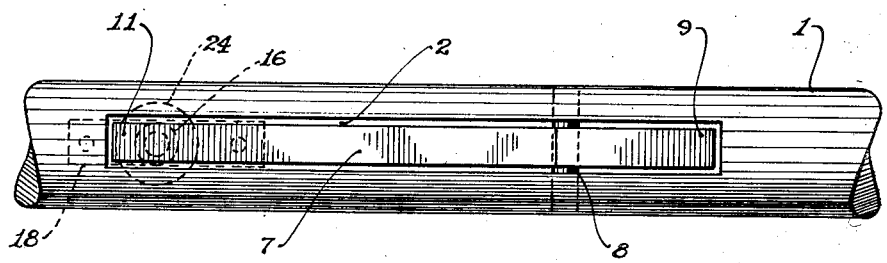
Figure 4 is a plan view of the stopping means.
Figure 5:
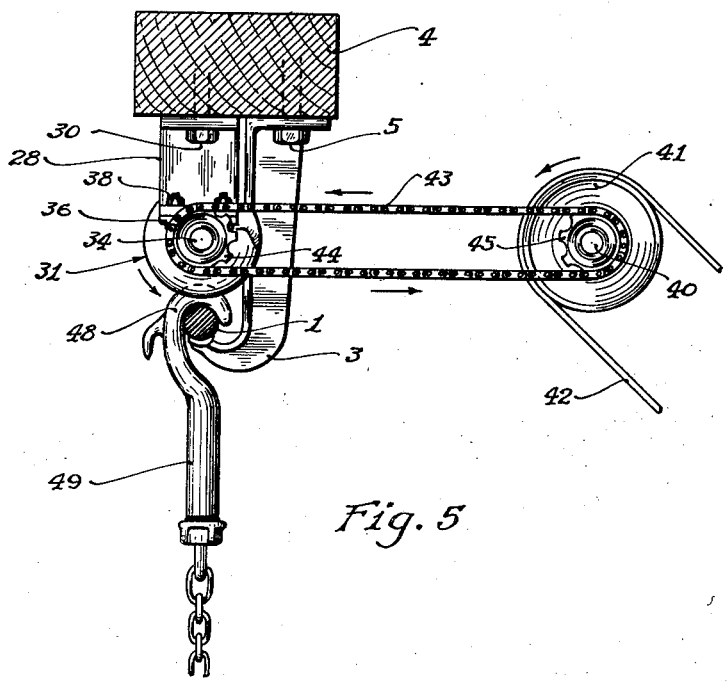
Figure 5 is an end view taken on line 5—5 of Figure 1.

As will be seen by reference to Figures 1 and 2, worm wheel 31 is positioned parallel to bleeding rail 1 and is spaced a short distance above rocker 7. It will also be seen that arm 11 of rocker 7 is limited in its upward movement by flange plate 22.

Shaft 40 is fixed in an elevated position by suitable means not shown and is driven by any suitable means such as pulley 41 and belt 42 extending from a motor not shown. Shaft 34 is driven by chain 43 trained upon sprocket wheels 44 and 45 pinioned upon shafts 34 and 40, respectively.

In operation, shackled carcass 47 suspended by hook 48 of shackle 49 travels by gravity down inclined bleeding rail 1 in the direction of the arrow indicated by the numeral 12. Arm 11 of rocker 7 being normally in a raised position and arm 9 being normally maintained below bleeding rail 1, the shackle first to travel down bleeding rail 1 will pass over arm 9 and against end 51 of worm wheel 31 and be conveyed by the several threads 32 to the opposite end 52, whence it will be free to continue its travel by gravity to the discharge end 33 of bleeding rail 1.

As will be seen by reference to Figure 2, the first shackle 49, upon engaging worm wheel 31, will quickly pass beyond short arm 9 of rocker 7 and thereupon engage long arm 11. The weight of the carcass suspended from the shackle passing through the feeding mechanism will cause hook 48 to depress long arm 11 within slot 2, thereby raising short arm 9 above the surface of bleeding rail 1. Short arm 9, upon being raised, will serve to stop the next succeeding shackle 49 and continue in that position until the preceding shackle has cleared arm 11. Arm 11, upon being cleared, will resume its normal position by action of coil spring 21, thereby lowering short arm 9 to permit passage of the next succeeding shackle in contact with worm wheel 31.

It is apparent from the foregoing description that shackled carcasses traveling on bleeding rail 1 may be spaced at any suitable distance by changing the gearing of worm wheel 31 or by altering the length of long arm 11 of rocker 7 to relatively alter the action of short arm 9.

At discharge end 33 the carcass will be released from its respective shackle by releasing means 53 and the shackle returned to the shackling pen on a shackle return rail provided therefor, as more fully described in the application for patent, Serial No. 752,844, entitled "Hog Drop", filed November 13, 1934, by Frederick T. Brewster.

I claim:

1. In a device of the class described including an inclined rail for the gravity conveyance of shackled objects and having an elongated slot in the upper surface thereof, means for spacing said objects on said rail comprising a rocker pivotally mounted within said slot, said rocker having a long arm and a short arm respectively extending with and against the path of travel of said objects, a pin pivotally extending from said long arm through said rail and means including a spring operatively connected with said pin for normally maintaining the long arm in a raised position above the surface of the rail and the short arm in a lowered position below the surface of the rail.

2. In a device of the class described including an inclined rail for the gravity conveyance of shackled objects and having an elongated slot, means for spacing said objects on said rail comprising a rocker pivotally mounted within said slot, said rocker having arms extending with and against the path of travel of said shackled objects and a worm wheel rotatably mounted in operative relation with said rocker for controlling the advance of shackles thereover, the arm extending with the path of travel being normally maintained above the surface of said rail and the arm extending against the path of travel being normally maintained below the surface of the rail.

3. In a device of the class described including an inclined rail for the gravity conveyance of shackled objects and having an elongated slot, means for spacing said objects on said rail comprising a rocker pivotally mounted within said slot, a long arm on said rocker extending with the path of travel of said objects and normally maintained above the surface of said rail, a short arm on said rocker extending against the path of travel of said objects and normally maintained below the surface of said rail, and a worm wheel rotatably mounted in operative relation with said rocker for controlling the advance of shackles thereover, the first mentioned arm being depressed below the surface of the rail during the travel of a shackle thereover, thereby raising the last mentioned arm above the surface of the rail to act as a stopping means for the next succeeding shackle.

4. In a device of the class described including an inclined rail for the gravity conveyance of shackled objects and having an elongated slot in the upper surface thereof, a rocker pivotally mounted within said slot, said rocker having a long arm and a short arm respectively extending with and against the path of travel of said shackles, a pin pivotally extending from said long arm through said rail, means including a spring operatively connected with said pin for normally maintaining the long arm in a raised position above the surface of the rail and the short arm in a lowered position below the surface of the rail and a worm wheel rotatably mounted in operative relation with said rocker controlling the advance of shackles thereover.

5. In a conveying means including an inclined rail for the gravity conveyance of shackles, a spacing means comprising a rocker lever mounted relative to the rail and provided with angularly extending arms normally adapted for passage of the shackles traveling on the rail, and a worm wheel rotatably mounted in operative relation with the rocker lever for controlling the advance of the shackles relative to the rocker lever, one arm of the rocker lever being operable for withholding succeeding shackles during passage of a shackle relative to the other arm of the rocker lever.

6. In a conveying means including an inclined rail for the gravity conveyance of shackles, means for spacing the shackles traveling on the conveying means comprising a rocker lever mounted in operative relation with the rail and normally adapted for passage of the shackles traveling on the conveying means, and a worm wheel rotatably mounted in operative relation with the rocker lever for controlling the advance of the shackles relative to the rocker lever, the rocker lever being operable for withholding succeeding shackles during passage of a shackle thereover.

7. In a conveying means including an inclined rail for the gravity conveyance of objects thereover and having a recess in the surface thereof, means for spacing the objects advanced on the conveying means comprising a rocker lever pivotally mounted within the recess and normally adapted for the passage of the objects traveling on the rail, and a worm wheel rotatably mounted in operative relation with the rocker lever for controlling the advance of the objects relative to the rocker lever.

8. In a conveying means including an inclined rail for the gravity conveyance of objects thereon and having a recess in the surface thereof, means for spacing the objects advanced on the conveying means comprising a spring-tensioned rocker lever pivotally mounted within the recess and normally adapted for the passage of the objects traveling on the rail, and a worm wheel rotatably mounted in operative relation with the rocker lever for controlling the advance of the objects relative to the rocker lever.

9. In a conveying means including an inclined rail for the gravity conveyance of object supporting shackles and having an elongated slot, means for spacing the shackles on the rail comprising a rocker lever pivotally mounted within the slot and normally adapted for passage of the shackles traveling on the rail, and a worm wheel operatively mounted relative to the rocker lever for controlling the advance of the shackles relative to the rocker lever, the rocker lever being operable for withholding succeeding shackles during passage of a shackle thereover.

10. In a conveying means including an inclined rail for the gravity conveyance of object supporting shackles and having an elongated slot, means for spacing the shackles on the rail comprising a rocker lever pivotally mounted within the slot and provided with arms adapted for pivotal movement above and below the surface of the rail, the arms being normally adapted for passage of the shackles traveling on the rail, and a worm wheel rotatably mounted in operative relation with the rocker lever for controlling the advance of the shackles traveling relative to the rocker lever, one arm of the rocker lever being operable for withholding succeeding shackles during passage of a shackle over the other arm of the rocker lever.

11. In a conveying means including an inclined rail for conveyance of object supporting shackles and having an elongated slot in the upper surface thereof, means for spacing the shackles traveling on the rail comprising a rocker lever pivotally mounted within the slot, the rocker lever having a long arm and a short arm respectively extending with and against the path of travel of the shackles on the rail and adapted for pivotal movement above and below the surface of the rail, the arms being normally adapted for passage of the shackles traveling on the rail, and a worm wheel rotatably mounted in operative relation with the rocker lever for controlling the advance of the shackles relative to the rocker lever, the arm extending against the path of travel of the shackles on the rail being operable for withholding succeeding shackles during passage of a shackle relative to the arm extending with the path of travel of the shackles on the rail.

WILLIAM C. MEISER.